US009886564B2

(12) United States Patent
Fujii et al.

(10) Patent No.: US 9,886,564 B2
(45) Date of Patent: Feb. 6, 2018

(54) SERVER SYSTEM, COMMUNICATION SYSTEM, COMMUNICATION TERMINAL DEVICE, PROGRAM, RECORDING MEDIUM, AND COMMUNICATION METHOD

(71) Applicant: BankGuard, Inc., Tokyo (JP)

(72) Inventors: Haruhiko Fujii, Tokyo (JP); Shuichi Matsuda, Kashiwa (JP)

(73) Assignee: BankGuard, Inc., Tokyo (JP)

( * ) Notice: Subject to any disclaimer, the term of this patent is extended or adjusted under 35 U.S.C. 154(b) by 0 days.

(21) Appl. No.: 15/339,296

(22) Filed: Oct. 31, 2016

(65) Prior Publication Data

US 2017/0046506 A1     Feb. 16, 2017

Related U.S. Application Data

(63) Continuation of application No. PCT/JP2015/062704, filed on Apr. 27, 2015.

(30) Foreign Application Priority Data

| May 1, 2014 | (JP) | 2014-104705 |
| Jun. 12, 2014 | (JP) | 2014-135075 |
| Sep. 1, 2014 | (JP) | 2014-177578 |

(51) Int. Cl.
*G06F 17/30* (2006.01)
*H04N 7/16* (2011.01)
(Continued)

(52) U.S. Cl.
CPC ........ *G06F 21/10* (2013.01); *G06F 17/30268* (2013.01); *G06F 17/30339* (2013.01);
(Continued)

(58) Field of Classification Search
CPC ............... G06F 21/10; G06F 17/30268; G06F 17/30339; G06F 21/36; G06F 21/6218;
(Continued)

(56) References Cited

U.S. PATENT DOCUMENTS 8,881,251 B1 * 11/2014 Hilger ................. H04L 63/083
                                                            713/183
8,904,479 B1 * 12/2014 Johansson ............... G06F 21/36
                                                            382/181
(Continued)

FOREIGN PATENT DOCUMENTS

| JP | 2004-102460 A | 4/2004 |
| JP | 2004102460 A | 4/2004 |

(Continued)

OTHER PUBLICATIONS

William G. Morein; Using Graphic Turing Tests to Counter Automated DDoS Attacks Against Web Servers; ACM; 2003; p. 8-19.*

(Continued)

*Primary Examiner* — Monjour Rahim
(74) *Attorney, Agent, or Firm* — Muncy, Geissler, Olds & Lowe, P.C.

(57) ABSTRACT

Provided is a network system which improves a security and prevents illegal use when providing services such as Internet banking services. A random graphic table (RMT) is issued to a user, and having text characters which a user inputs and figures which corresponds to the text characters, respectively, and which is unrelated to the text characters such as a photograph. A banking organization server (30) manages random graphic table data corresponding to the random graphic table (RMT), distributes data for input including a portion of the random graphic table data to a communication terminal device (10) when information is inputted, and executing a specification of information to be specified (Continued)

while comparing the data for input with the random graphic table (RMT).

15 Claims, 14 Drawing Sheets

(51) Int. Cl.
*G06F 21/10* (2013.01)
*G06F 21/36* (2013.01)
*G06Q 20/40* (2012.01)
*G06F 21/62* (2013.01)
*G06Q 20/32* (2012.01)

(52) U.S. Cl.
CPC .......... *G06F 21/36* (2013.01); *G06F 21/6218* (2013.01); *G06Q 20/3223* (2013.01); *G06Q 20/409* (2013.01); *G06F 2221/0775* (2013.01)

(58) Field of Classification Search
CPC ........ G06F 2221/0775; G06Q 20/3223; G06Q 20/409
USPC .......................................................... 726/28
See application file for complete search history.

(56) References Cited

U.S. PATENT DOCUMENTS

| | | | | |
|---|---|---|---|---|
| 8,925,056 | B2* | 12/2014 | Nikankin | H04L 63/0884 |
| | | | | 713/185 |
| 9,607,140 | B2* | 3/2017 | Smith | G06F 21/36 |
| 9,622,058 | B1* | 4/2017 | Imes | H04W 4/18 |
| 2004/0061773 | A1* | 4/2004 | Liu | H04N 7/147 |
| | | | | 348/14.02 |
| 2004/0234097 | A1* | 11/2004 | Verhoeven | G06T 11/00 |
| | | | | 382/100 |
| 2006/0020559 | A1 | 1/2006 | Steinmetz | |
| 2006/0075241 | A1* | 4/2006 | Deguillaume | G06F 21/10 |
| | | | | 713/176 |
| 2006/0098841 | A1 | 5/2006 | Tuyls et al. | |
| 2006/0206919 | A1* | 9/2006 | Montgomery | G06F 21/31 |
| | | | | 726/2 |
| 2007/0094717 | A1* | 4/2007 | Srinivasan | G06F 21/36 |
| | | | | 726/5 |
| 2008/0052245 | A1 | 2/2008 | Love | |
| 2008/0060052 | A1* | 3/2008 | Hwang | G06F 21/31 |
| | | | | 726/2 |
| 2008/0148352 | A1* | 6/2008 | Matsumoto | G06F 21/34 |
| | | | | 726/2 |
| 2008/0209223 | A1* | 8/2008 | Nandy | G06F 21/36 |
| | | | | 713/185 |
| 2008/0250481 | A1* | 10/2008 | Beck | H04L 63/083 |
| | | | | 726/6 |
| 2009/0187583 | A1* | 7/2009 | Pape | G06Q 10/08 |
| 2009/0212929 | A1* | 8/2009 | Drory | B60R 25/10 |
| | | | | 340/426.1 |
| 2010/0011419 | A1 | 1/2010 | Seo | |
| 2011/0154035 | A1* | 6/2011 | Yao | H04L 9/321 |
| | | | | 713/168 |
| 2011/0185437 | A1* | 7/2011 | Tran | H04L 63/104 |
| | | | | 726/28 |
| 2011/0247067 | A1* | 10/2011 | Hirose | G06F 3/0488 |
| | | | | 726/19 |
| 2012/0256723 | A1* | 10/2012 | Grover | G06F 21/31 |
| | | | | 340/5.8 |
| 2013/0010958 | A1* | 1/2013 | Yao | H04L 63/102 |
| | | | | 380/270 |
| 2013/0339746 | A1* | 12/2013 | Ignatchenko | H04L 9/3226 |
| | | | | 713/183 |
| 2013/0347087 | A1* | 12/2013 | Smith | G06F 21/36 |
| | | | | 726/7 |
| 2014/0012763 | A1 | 1/2014 | Madden et al. | |
| 2014/0082700 | A1* | 3/2014 | Hatano | G06F 21/36 |
| | | | | 726/4 |
| 2015/0186661 | A1* | 7/2015 | Hirase | G06F 21/32 |
| | | | | 726/28 |

FOREIGN PATENT DOCUMENTS

| | | |
|---|---|---|
| JP | 2006-520047 A | 8/2006 |
| JP | 2006520047 A | 8/2006 |
| JP | 2007-293562 A | 11/2007 |
| JP | 2007293562 A | 11/2007 |
| JP | 2008-234440 A | 10/2008 |
| JP | 2008234440 A | 10/2008 |
| JP | 2009-157640 A | 7/2009 |
| JP | 2009-169929 A | 7/2009 |
| JP | 2009157640 A | 7/2009 |
| JP | 2009169929 A | 7/2009 |
| JP | 2010-049554 A | 3/2010 |

OTHER PUBLICATIONS

Extended European Search Report issued in corresponding EP Application 15786540.3, dated Jan. 17, 2017, 6 pages.
English translation of Written Opinion of the International Searching Authority for PCT/JP2015/062704 dated Nov. 10, 2016.

* cited by examiner

BANKING ORGANIZATION SERVER DEVICE 30

FIG. 6

| USER ID | USER ATTRIBUTE INFORMATION ||||
| | NAME | ADDRESS | ACCOUNT NAME | FIRST PASSCODE |
| --- | --- | --- | --- | --- |
| user001 | ○○TARO | *** KITA-KU TOKYO | 23511000 | **** |
| user002 | △HANAKO | *** KITA-KU OSAKA | 222222 | ***** |
| user003 | ×△SHIRO | *** CHUO-KU OSAKA | 333333 | **** |
| ... | ... | ... | ... | ... |

FIG. 7

| USER ID | RANDOM GRAPHIC TABLE DATA |
|---------|---------------------------|
| user001 | DATA001 |
| user002 | DATA002 |
| user003 | DATA003 |
| user004 | DATA002 |
| ⋮ | ⋮ |

FIG. 8

| BANKING ORGANIZATION CODE (SWIFT CODE) | BANK NAME | BRANCH OFFICE NAME | BRANCH OFFICE CODE | BRANCH OFFICE ADDRESS |
|---|---|---|---|---|
| B101 | OEDO BANK | SHINJUKU | 456 | *** SHINJUKU-KU TOKYO |
| | | SHIBUYA | 321 | *** SHIBUYA-KU TOKYO |
| | | NIHONBASHI | 1 | *** CHUO-KU TOKYO |
| B102 | △△BANK | NAGOYA-MAIN | 1 | *** NAGOYA-SHI AICHI |
| | | SHIZUOKA | 110 | *** SHIZUOKA-SHI SHIZUOKA |
| B200 | ○○SINKIN BANK | SENDAI | 1 | *** SENFDAI-SHI MIYAGI |
| | | MORIOKA | 3 | *** MORIOKA-SHI IWATE |
| ... | ... | ... | ... | ... |

FIG. 9

| USER ID | ACCOUNT INFORMATION ||||
| | ACCOUNT NUMBER | BANK NAME | BRANCH OFFICE NAME | BALANCE | REGISTERED PAYMENT DESTINATIONS |
|---|---|---|---|---|---|
| user001 | 1234567 | OEDO BANK | SHINJUKU | ¥****** | OEDO BANK, NIHONBASHI MAIN, **** |
| | | | | | △ BANK, SHIBUYA BRANCH, **** |
| user002 | 2345678 | △△BANK | NAGOYA-MAIN | ¥****** | OEDO BANK, SHINJUKU BRANCH, **** |
| | | | | | △△ BANK, SHIZUOKA BRANCH, **** |
| user003 | 3456789 | ○○BANK | NIHONBASHI | ¥***** | OEDO BANK, SHIBUYA BRANCH, **** |
| | | | | | △ BANK, NIHONBASHI BRANCH, **** |
| ... | ... | ... | ... | ... | ... |

FIG. 11

OEDO BANK INTERNET
BANKING SERVICE

* PLEASE ENTER YOUR
  ACCOUNT NAME.

* PLEASE ENTER YOUR FIRST
  PASSCODE

LOG IN

RANDOM GRAPHIC TABLE
RMT

FIG. 12B

REMITTANCE ACCOUNT NUMBER: 7654321

(1) PLEASE ENTER THE AMOUNT OF REMITTANCE.   ¥1,000,000.-

(2) PLEASE ENTER THE BENEFICIARY BANK NAME.   OEDO BANK (3) PLEASE ENTER THE BRANCH OFFICE NAME.   SHINJUKU (4) PLEASE ENTER THE ACCOUNT TYPE.   SAVINGS (5) PLEASE ENTER THE FIRST FIVE DIGITS FROM THE TOP OF THE ACCOUNT NUMBER.   76543

(6) PLEASE SELECT THE FIGURE RELEVANT TO THE SECOND DIGIT FROM THE BOTTOM OF THE ACCOUNT NUMBER FROM ROW B

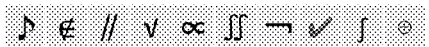

(7) PLEASE SELECT THE FIGURE CORRESPONDING TO THE LAST DIGIT OF THE ACCOUNT NUMBER FROM ROW E.

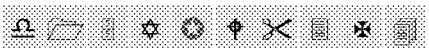

ENTRY SCREEN

CONFIRMATION SCREEN

SERVER SYSTEM, COMMUNICATION SYSTEM, COMMUNICATION TERMINAL DEVICE, PROGRAM, RECORDING MEDIUM, AND COMMUNICATION METHOD

CROSS REFERENCE TO RELATED APPLICATIONS

This application is a Continuation Application of International Application No. PCT/JP2015/062704 filed on Apr. 27, 2015, claiming priority based on Japanese Patent Application No. 2014-104705, filed on May 1, 2014, Japanese Patent Application No. 2014-135075, filed on Jun. 12, 2014, and Japanese Patent Application No. 2014-177578, filed on Sep. 1, 2014, the contents of all of which are incorporated herein by reference in their entirety.

FIELD OF THE INVENTION

The present invention relates to a server system, a communication system, a program, a communication terminal device, a recording medium and a communication method, in which transmission/reception of various kinds of information is performed while securing confidentiality.

BACKGROUND ART

In recent years, illegal use, as represented by so-called spoofing, has been increasing rapidly in the World Wide Web (WWW)-mediated services, such as Internet banking services, on-line stores, or the like.

For example, in the case of Internet banking, in addition to the systems in which user authentication is performed by making use of a banking organization-issued random number table that is unique to each user, systems in which user authentication is performed by making use of, for example, a one-time password generated by a cryptographic token issued by the banking organization (for example, Patent Document 1), have been put to practical use.

PRIOR ART DOCUMENTS

Patent Documents

[Patent Document 1] Japanese Laid-Open Patent Application No. 2010-049554

SUMMARY OF THE INVENTION

Problem to be Solved by the Invention

However, with the above-described systems, communication security at the time of service delivery is not sufficiently secured, and thus, it is creating a breeding ground for illegal use.

The present invention is made in order to solve the above-described problem, and an object thereof is to provide a server system, and the like, that are capable of improving security at the time of delivering various kinds of services and that are capable of preventing illegal use.

Means for Solving the Problem (1) In order to solve the above-described problem, the server system of the present invention has:

a receiver that receives, via a network, data from a communication terminal device that communicates with and is connected to the server system;

a controller that controls a database in which table data is recorded in association with identification information for identifying a user, the table data being predetermined for each user of the communication terminal device and having entry target characters entered at the communication terminal device and figures pre-allocated to the respective entry target characters that are associated with each other;

a data specifying processer that specifies, when a given request designated by a user from the communication terminal device is received by the receiver, table data that corresponds to the user;

an extracting processer that extracts the figures that correspond to entry target characters to be specified by the user based on the specified table data;

a distributer that generates data for entry that is associated with each of the extracted figures and that includes marker information to be used when relevant figures are displayed at a relevant communication terminal device, and that distributes the generated data for entry to the communication terminal device;

an acquiring processer that acquires, when the figures are displayed at the communication terminal device based on the distributed data for entry, the marker information that corresponds to the figures entered by the user from the communication terminal device;

a determining processer that determines the relevant figures based on the acquired marker information; and a processer that specifies the entry target characters to be specified based on the determined figures and that executes a given process based on the specified entry target characters.

Based on this configuration, the server system of the present invention makes use of figures when the user enters the entry target characters. Thus, the server system is capable of specifying account information (account number and remittance amount), authentication information (login information) or other information to be specified by the user, without directly entering such information to be specified by an input device such as a keyboard.

Accordingly, the server system of the present invention is capable of preventing: the leakage of security-related information (for example, a password) caused by a user's carelessness, for example, by entering, all at once, at a phishing site, all of the information described in a number table, or the like, which is issued to the user in advance; and the transfer of information to a third party who performs an illegal login.

In addition, the server system of the present invention makes use of the marker information, such as the display positions of the figures, instead of the entry target characters or the figures specifying the entry target characters, for the data communication between the communication terminal devices and the server systems. Thus, the server system of the present invention is capable of preventing the information to be specified by a user from being stolen or tampered with by a third party, between the communication terminal device and the server system.

Accordingly, the server system, and the like, of the present invention is capable of preventing illegal logins and man-in-the-middle attacks made by a third party to the services delivered to the users.

Consequently, the server system of the present invention is capable of preventing the leakage of the security-related information, illegal uses and man-in-the-middle attacks, and of improving the security at the time of delivering various services including Internet banking service, or the like.

(2) In order to solve the above-described problem, the communication terminal device of the present invention is a communication terminal device that is connected to a server system that executes various processes, via a network, and that deliver various services to a user while they transmit/receive data to/from such server systems, and the communication terminal device of the present invention has a configuration in which the following units are provided:

an acquiring processor that acquires part of table data, along with control information for controlling, at least, display positions for displaying figures on a display, from the server system, the table data being table data predetermined for each user, the table data including entry target characters that are entered by the user and figures that are pre-allocated to the respective entry target characters, the entry target characters and the figures in the table data being associated with each other;

an receiver that receives an input operation of the user in accordance with an image displayed based on the acquired table data;

a specifying processor that specifies the display positions corresponding to the figures designated by the user in response to the input operation; and a transmitter that transmits information that indicates the display positions corresponding to the specified figures to the server system.

Based on this configuration, the communication terminal device of the present invention makes use of figures when the user enters the entry target characters. Thus, the communication terminal device of the present invention is capable of specifying account information (account number and remittance amount), authentication information (login information) or other information to be specified by the user, without directly entering such information to be specified by an input device such as a keyboard.

Accordingly, the communication terminal device of the present invention is capable of preventing: the leakage of security-related information (for example, a password) caused by a user's carelessness, for example, by entering, all at once, at a phishing site, all of the information described in random number table, or the like, which is issued to a user in advance; and the transfer of information to a third party who performs an illegal login.

In addition, the communication terminal device of the present invention make use of the marker information, such as the display positions of the figures, instead of the entry target characters or the figures specifying the entry target characters, for the data communication between the communication terminal device and the server system. Thus, the communication terminal device of the present invention is capable of preventing the information to be specified by a user from being stolen or tampered with by a third party, between the communication terminal device and the server system.

Accordingly, the communication terminal device of the present invention is capable of preventing illegal logins and man-in-the-middle attacks made by a third party to the services delivered to the users.

Consequently, the communication terminal device of the present invention is capable of preventing the leakage of the security-related information, illegal uses and man-in-the-middle attacks, and of improving the security at the time of delivering various services including the Internet banking service, or the like.

(3) In order to solve the above-described problem, a recording medium of the present invention is a recording medium having figures that are visible and that are for specifying, at a server system that delivers various services, entry target characters entered by a user when the user accesses the server system by making use of a communication terminal device, the recording medium comprising:

a table that has a plurality of rows and a plurality of columns, a plurality of different entry target characters and a plurality of figures that differ for each entry target character being arranged in a row or column, and each figure having a shape that is unconverted by a character code used at the time of user operational input based on an input device to be used by the user for entering predetermined information.

Based on this configuration, the recording medium of the present invention is formed with a random number table in which figures such as, for example, symbols, designs, pictures or images (for example, still images including photographs, moving images or hand-written characters), from which the entry target characters cannot be deduced directly (i.e. shapes that cannot be converted by means of character codes used at the time of user operational input based on an input device used by the user for entering predetermined information) are associated with entry target characters. Thus, when entering the entry target characters, such entry target characters can be specified without using such entry target characters.

Accordingly, the storage medium of the present invention is capable of preventing: the leakage of security-related information (for example, a password) caused by a user's carelessness, for example, by entering, all at once, at a phishing site, all of the information described in random number table, or the like, which is issued to a user in advance; and the transfer of information to a third party who performs an illegal login.

In addition, the storage medium of the present invention can make use of the marker information, such as the display positions of the figures, instead of the entry target characters or the figures specifying the entry target characters, for the data communication between the communication terminal devices and the server systems. Thus, the storage medium of the present invention is capable of preventing the information to be specified by a user from being stolen or tampered with by a third party, between the communication terminal devices and the server systems.

Accordingly, the storage medium of the present invention is capable of preventing illegal logins and man-in-the-middle attacks made by a third party to the services delivered to the users.

Consequently, the storage medium of the present invention is capable of preventing the leakage of the security-related information, illegal uses and man-in-the-middle attacks, and of improving the security at the time of delivering various services including the Internet banking service, or the like.

Effect of the Invention

The server system, and the like, according to the present invention are capable of preventing the leakage of security-related information, illegal use and man-in-the middle attacks and of improving the security at the time of delivering various services, such as the Internet banking service or the like.

BRIEF DESCRIPTIONS OF THE DRAWINGS

FIG. 6 is a diagram illustrating an example of data to be recorded in a user management database provided in a banking organization server of an embodiment.

FIG. 7 is a diagram illustrating an example of data to be recorded in a random graphic table data management database provided in a banking organization server of an embodiment.

FIG. 8 is a diagram illustrating an example of data to be recorded in a banking organization management database provided in a banking organization server of an embodiment.

FIG. 9 is a diagram illustrating an example of data to be recorded in an account management database provided in a banking organization server of an embodiment.

FIG. 11 is a diagram illustrating an example of a service login screen displayed in a communication terminal device of an embodiment.

FIGS. 12A and 12B are diagrams each illustrating an example of an entry screen displayed in a communication terminal device of an embodiment.

Figure 13:
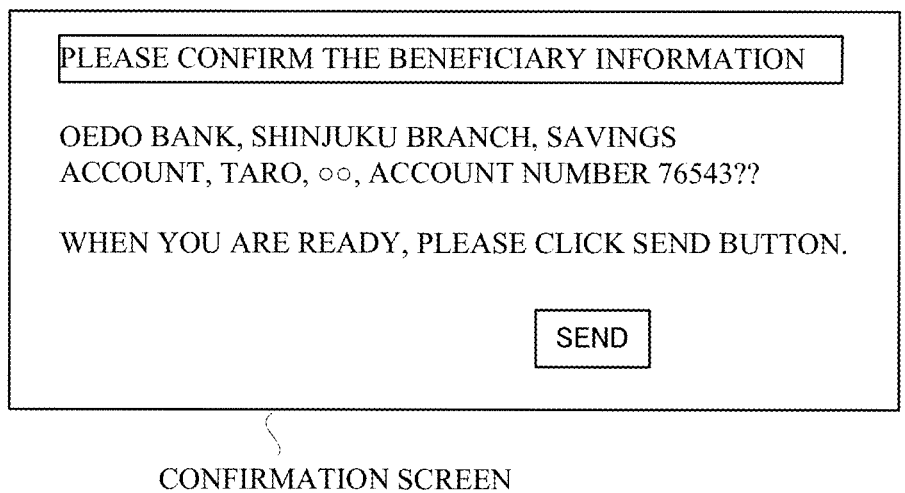

FIG. 13 a diagram illustrating an example of a confirmation screen displayed in a communication terminal device of an embodiment.

EMBODIMENTS OF THE INVENTION

Hereinafter, embodiments of the present invention will be described with reference to the drawings. It should be noted that the following embodiments are embodiments wherein a server system, a program for the server system, a communication terminal device, a program for the communication terminal device, a recording medium, a character entry method and an information encryption method, all according to the present invention, are applied to a network system that includes: a communication terminal device, which is used by a user (i.e. a person who opened an account) who receives the provision of a banking service via the Internet (hereinafter referred to as "the Internet banking service"); and a banking organization server which is connected to and communicates with the communication terminal device via the network.

It should also be noted that the embodiments described below will not unduly limit the content of the invention described in the claims. In addition, the entire configuration described in the present embodiments is not necessarily a required component of the present invention.

[1] Outline of Network System

First, the configuration and outline of network system 1 in the present embodiment will be described with reference to FIGS. 1 and 2.

Figure 1:
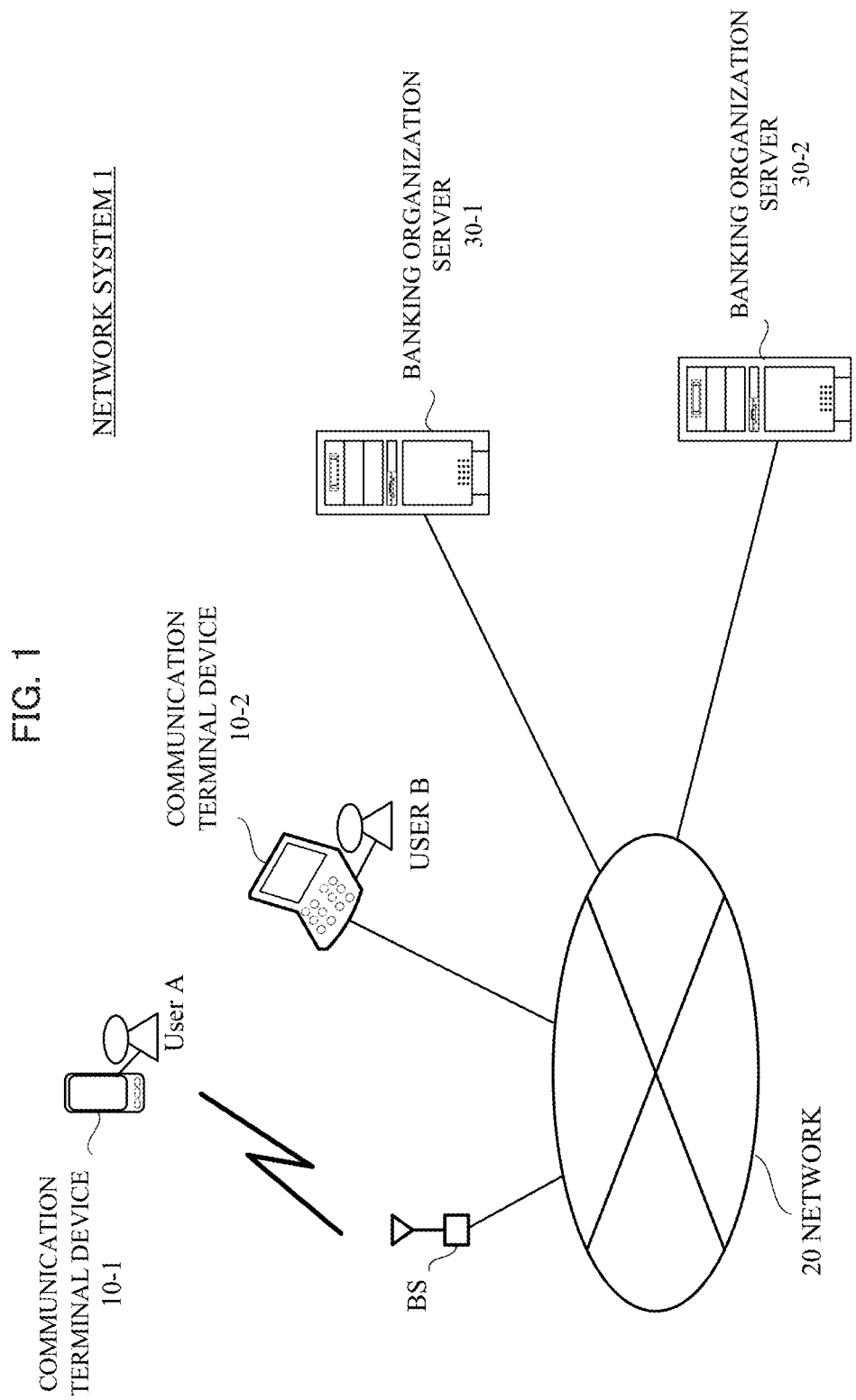
FIG. 1 is a system configuration diagram illustrating a system configuration in an embodiment of the network system according to the present invention.
Figure 2:
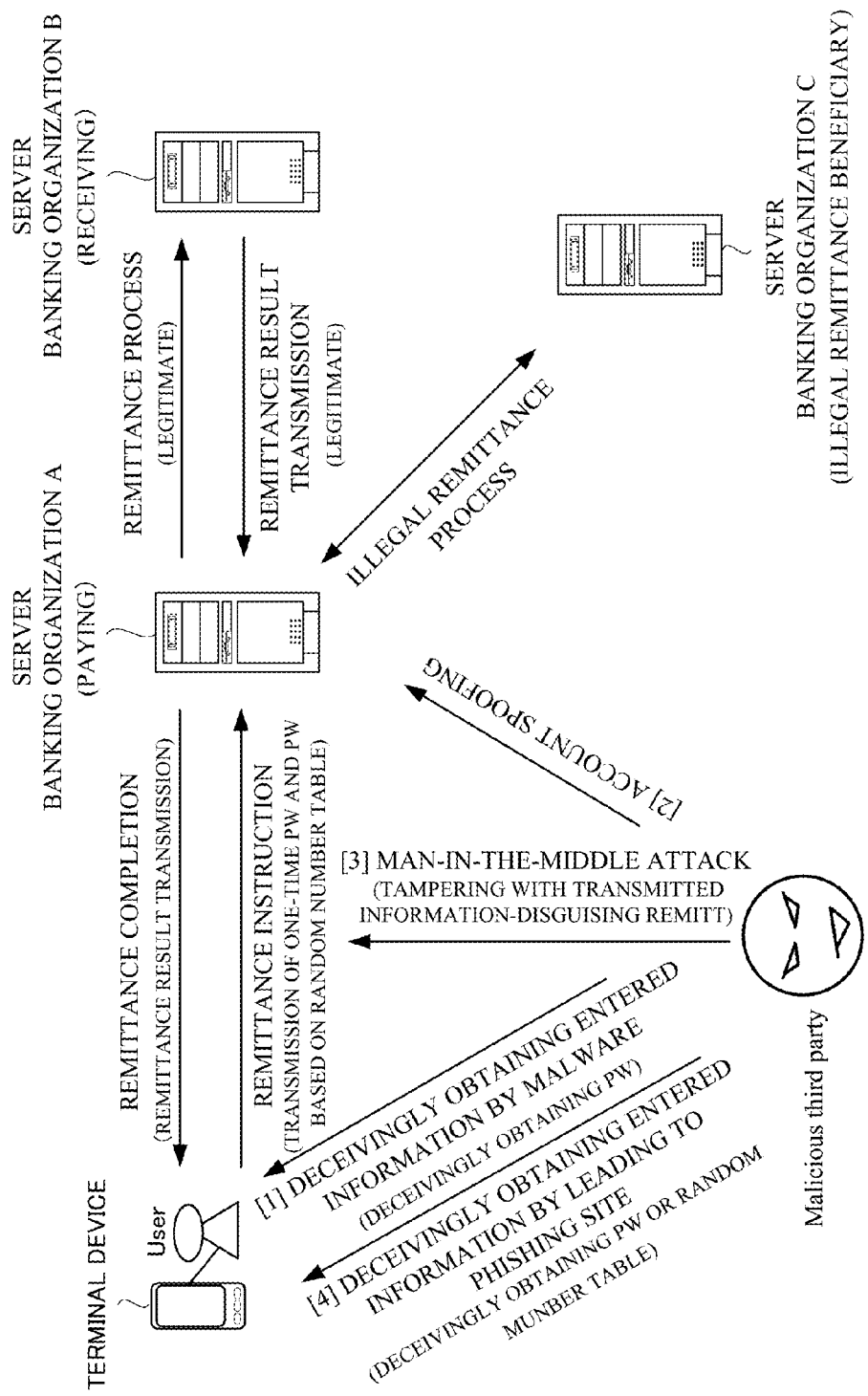
FIG. 2 is a diagram for explaining the ways of illegal attacks that have conventionally been an issue.

It should be noted that FIG. 1 is a diagram illustrating the system configuration of network system 1 of the present embodiment and FIG. 2 is a diagram for explaining attacks made by a malicious third party, which have been occurring in conventional internet banking services.

In order to prevent the drawings from becoming complicated, only some users, communication terminal devices 10, banking organizations, banking organization servers 30 and a malicious third party are displayed in each of the above drawings. In other words, more users, communication terminal devices 10, banking organizations, banking organization servers 30, and the like, than those shown in the drawings are present in the actual network system 1.

Network system 1 of the present embodiment has a configuration for separately delivering the Internet banking services to each user, and is a system capable of improving the security of the Internet banking service by specifying entry target characters necessary for executing various processes in the Internet banking service, such as beneficiary information, including an account, a beneficiary bank and the like, or the amount of remittance and the like, by making use of a given random graphic table RMT that can prevent the leakage of security-related information, illegal use and the man-in-the middle attacks.

In particular, as shown in FIG. 1, network system 1 of the present embodiment includes: a plurality of communication terminal devices 10 owned by the respective users; and a plurality of banking organization servers 30, which are managed and operated by the respective banking organizations, which are connected to communication terminal devices 10 via network 20, and which execute a remittance process, for sending a remittance to a third party's account, and other settlement processes.

In addition, in network system 1 of the present embodiment, a given random graphic table RMT, in which: entry target characters and figures are associated with each other, is used. The entry target characters are specified by a specified user. For example, the entry target characters include numerical characters, alphabetical characters, hiragana characters, katakana characters, kanji characters (Chinese characters) and others (for example, any characters that can generally be entered with an input device, such as a keyboard, etc.). The figures is deduced directly from the above entry target character (i.e. shapes that is unconverted by character codes used at the time of user operational input based on an input device used by a user for entering predetermined information). For example, the figures include symbols, designs, picture, images (for example, still images including photographs, moving images or hand-written characters), and the like. Thus, an improvement in security of the above Internet banking service is achieved by the random graphic table RMT.

For example, as shown in FIG. 2, in conventional Internet banking services, when a remittance is to be made from a server of (paying) banking organization A to a server of (receiving) banking organization B based on a remittance instruction from a terminal device, which is based on a user's instructions, the following major types of attacks and fraud are quite rampant, and damage, such as illegal remittances, bank transfer scams, and the like, occur frequently.

(1) Type 1 ([1] in FIG. 2)

This is a type where a terminal device, such as a personal computer, used by a user, is infected with malware, such as a key logger, in some way and entered information, such as a password (hereinafter also referred to as "PW") entered by the user, is obtained. In this case, a malicious third party illegally logs into the server of (paying) banking organization A as a legitimate user, using the illegally-obtained password, etc., and provides a remittance instruction, and an illegal remittance process is executed in which an illegal remittance is made to an account, etc. of the malicious third party, and more specifically, to a server of (illegal remittance beneficiary) banking organization C.

(2) Type 2 ([2] in FIG. 2)

This is a type where a malicious third party utilizes a random number generator, etc. and implements an attack in which all combinations of numbers and English characters are transmitted in a round-robin manner to the server of (paying) banking organization A, and thereby takes over the user's account. In this case, the malicious third party provides a remittance instruction as a legitimate user to the server of (paying) banking organization A, and an illegal remittance process is executed in which an illegal remittance is made to an account, etc. of the malicious third party, and more specifically, to a server of (illegal remittance beneficiary) banking organization C.

(3) Type 3 ([3] in FIG. 2)

This is a man-in-the middle attack type where information sent from the user's terminal device to the server of the banking organization is tampered with on the network, and money is caused to be received at a beneficiary different from the original beneficiary by changing the beneficiary, the amount of money, etc. For example, when an instruction to make a remittance to the server of (receiving banking organization B is provided to the server of (paying) banking organization A from the terminal device, based on the user's instruction, such remittance instruction is analyzed and is tampered with into an instruction to be transmitted to the server of (illegal remittance beneficiary) banking organization C, and a process to make an illegal remittance to such illegal remittance beneficiary is executed. Furthermore, a remittance result from the illegal remittance beneficiary is disguised into a remittance result from the server of (receiving) banking organization B and is notified as a remittance completion of the server of (paying) banking organization A.

(4) Type 4 ([4] in FIG. 2)

This is a phishing fraud type ([4] in FIG. 2) where a URL of a website (i.e. a phishing website) that differs from the original website delivering services is sent to the user's terminal device by way of an email, etc., and the user is led to the phishing website, and various kinds of information, such as a password, a random graphic table or the like, are swindled by deceiving the user into entering such information in such phishing website. In this case, the malicious third party illegally logs into the server of (paying) banking organization A as a legitimate user, using the illegally-obtained password, etc., and provides a remittance instruction, and an illegal remittance process is executed in which an illegal remittance is made to an account, etc. of the malicious third party, and more specifically, to a server of (illegal remittance beneficiary) banking organization C.

Accordingly, in order to secure safety in the Internet banking service, it is necessary to take measures against all types of the various attacks and fraud described above so as to prevent the same.

On the other hand, conventional approaches for avoiding the various attacks described above include:

(A) an approach where a client certificate is used;

(B) an approach where a cryptographic token that generates a one-time password is used; and (C) an approach where authentication is performed by means of unique information (a subscriber number, serial number, or the like) inside the user's terminal device, or biological information such as fingerprints, veins, or the like.

However, in addition to the fact that it is easy for a client certificate to be taken over and it is therefore not an effective means of preventing attacks, it cannot be used for international commercial transactions since the types of such certificates differ from country to country. Moreover, in the case of making use of a cryptographic token, since it is expensive to manufacture a machine dedicated to cryptographic tokens, it is not widely used. Furthermore, the unique information of the user's terminal device is likely to be extracted by malware, and thus, in many cases, the effectiveness thereof cannot be ensured as a method for preventing attacks. Also, the case where biological information is used has not become popular due to the high cost of introducing devices, the decrease in user-friendliness such that the information cannot be easily entered, or difficulties in obtaining accurate biological information.

On the other hand, in addition to the above-described approaches (A) to (C), there is also an approach where a random number table (a table in which numbers are randomly arranged in a matrix), which is made available for user entry, is separately issued for each user by a banking organization, and identification is verified by performing an entry using such random number table.

However, in such case, the content of the information sent from the user to the banking organization is expressed in a character code, such as ASCII code, which can be specified in other general terminal devices. Accordingly, a malicious third party can easily specify the character string expressed by the transmitted/received information, and it is difficult to prevent man-in-the middle attacks that perform tampering with and disguising of the information during communication.

In addition, in the case of using such random number table, it is quite common for the user to be led to a phishing site and to inadvertently enter all of the information of the random number table in such phishing site. When all information of random number table is entered, the user is spoofed based on such random number table and illegal remittances are carried out.

Moreover, when the user's terminal device, etc. is infected with malware, such as a key logger, all information entered by the user in accordance with random number table may be stolen by a third party.

Figure 3:
FIG. 3 is a diagram illustrating an example of a random graphic table of an embodiment.

Hence, network system 1 of the present embodiment adopts a configuration in which:

(1) random graphic table RMT is used, which is issued at a banking organization in advance for each user and in which entry target characters, such as numerical characters and alphabetical characters, and figures, from which the above entry target characters cannot be deduced directly, such as symbols, photographs, graphics or pictures, are associated with each other as illustrated in FIG. 3;

(2) random graphic table data, in which random graphic tables RMTs of the respective users are compiled into data, and user IDs for identifying such users are managed by associating them with each other;

(3) when a user uses the Internet banking service, data (hereinafter referred to as "data for entry") is distributed, such data is for displaying to an appropriate user a plurality of figures, including figures corresponding to the entry target characters, based on the random graphic table data corresponding to the respective users and such data is for making the entry target characters to be entered by the figures;

(4) when a plurality of figures is provided (displayed) to the user based on the data for entry, positional information that indicates display positions for specifying the figures selected by the user and information for specifying such display positions (hereinafter referred to as "marker information") are specified; and (5) the figures are determined based on the specified marker information and finally the entry target characters are specified.

In particular, the present embodiment has a configuration in which the entry target characters, which are to be specified, are communicated as the marker information by making use of the above-described random graphic table RMT, and while the entry target characters cannot be specified by a third party during communication, the entry target characters, which are to be specified for the respective users, can be specified at banking organization servers 30.

Specifically, communication terminal device 10 is a communication terminal device, such as a personal computer (PC), a smartphone, or the like, used by a user, and it is adapted to connect to network 20, either directly or via base station BS, and to execute data communication with banking organization servers 30.

Communication terminal device 10 obtains resource data based on URLs in accordance with input operations of a user or the like, wherein such resource data is described in a markup language, such as eXtensible Markup Language (XML). Communication terminal device 10 has a browsing function that performs image display and data communication based on such resource data.

In particular, communication terminal device 10 is adapted such that, at the time of using the Internet banking service by using the browsing function, it logs into banking organization server 30, obtains data for entry, and transmits marker information in the figures entered based on random graphic table RMT to banking organization server 30.

On the other hand, banking organization server 30 is a computer system which is managed and operated by a corresponding banking organization. Banking organization server 30 has various databases (hereinafter referred to as "DBs") and executes various processes for delivering the Internet banking service.

In particular, banking organization server 30 of the present embodiment has a configuration so that the following processes can be executed:

(A) a data for entry distribution process, in which, at the time of delivering the Internet banking service, the banking organization server coordinates with communication terminal device 10, specifies a user, generates the data for entry based on the random graphic table data corresponding to random graphic table RMTs that is issued for each user, and distributes the generated data for entry to communication terminal device 10;

(B) an entry target characters specification process, in which the marker information entered by the user based on the data for entry and random graphic table RMT sent from communication terminal device 10 is received, and the entry target characters are specified based on the received marker information; and (C) a servicing process in which a predetermined Internet banking service is executed based on the specified entry target characters.

Specifically, banking organization server 30 of the present embodiment has a configuration in which:

(1) banking organization server 30 controls a database, in which the random graphic table data is recorded in association with identification information (i.e. user IDs) for identifying users, such random graphic table data being predetermined for each user of communication terminal device 10, and such random graphic table data having entry target characters that are entered at communication terminal device 10 and figures that are pre-allocated for each of the entry target characters associated with each other;

(2) when a given request (for example, a request for a settlement process) designated by a user is received from communication terminal device 10, banking organization server 30 specifies the random graphic table data corresponding to such user;

(3) banking organization server 30 extracts figures corresponding to the entry target characters to be specified by the user based on the specified random graphic table data;

(4) banking organization server 30 generates the data for entry, which is associated with each of the extracted figures and which includes marker information that is used when the relevant figures are displayed at the relevant communication terminal device 10, and distributes the generated data for entry to communication terminal device 10;

(5) when the figures are displayed at communication terminal device 10 based on the distributed data for entry, banking organization server 30 obtains the marker information corresponding to the figures entered by the user from the communication terminal device 10;

(6) banking organization server 30 determines the relevant figures based on the obtained marker information; and (7) banking organization server 30 specifies the entry target characters, which are to be specified, based on the determined figures and executes a given process, such as a settlement process, based on the specified entry target characters.

Based on such configuration, network system 1 of the present embodiment is adapted such that it can prevent: the leakage of security-related information (for example, a password) caused by a user's carelessness, for example, by entering, all at once, at a phishing site, all of the information described in random graphic table RMT, or the like, which is issued to a user in advance; and the transfer of information to a third party who performs an illegal login.

In addition, network system 1 of the present embodiment is adapted such that it can effectively prevent illegal logins and man-in-the middle attacks made by a third party to the services delivered to the users.

Accordingly, network system 1 of the present embodiment is adapted such that it can prevent the leakage of security-related information, illegal use and man-in-the middle attacks and it can improve the security at the time of delivering various services, such as the Internet banking service.

It should be noted that, in the present embodiment, data for entry includes:

(1) image data for allowing the respective figures to be selected at communication terminal device 10;

(2) positional data that indicates display positions when the image data is displayed at communication terminal device 10; and (3) display control data for causing the image data of the respective figures to be displayed at the corresponding display positions.

In addition, the plurality of figures for allowing the user to make a selection, which is used when the data for entry is generated, preferably include all figures corresponding to the entry target characters that have a potential to be entered. In the present embodiment, a description will be provided using the case where the figures that are used when the data for entry is generated include all figures corresponding to the entry target characters that have a potential to be entered.

However, when the generated data for entry does not include image data of the figures relevant to the entry target characters, it is sufficient to use image data of (N+1) figures with respect to N entry target characters to be specified by implementing a predetermined process such as re-issuance of such data for entry.

In the present embodiment, as for the marker information, display position information in the respective figures when being displayed at communication terminal device 10 will be used for the description; however, when the respective figures are displayed at communication terminal device 10 along with, for example, a matrix, information for specifying the respective figures selected by the user, such as information on row numbers and column numbers, is sufficient.

[2] Random Graphic Table

Next, random graphic table RMT of the present embodiment will be described with reference to FIG. 3. It should be noted that FIG. 3 is a diagram illustrating an example of random graphic table RMT used in the present embodiment.

Random graphic table RMT of the present embodiment is a storage medium in which, when a user uses communication terminal device 10 to access banking organization server 30 that delivers various services, figures for specifying, at banking organization server 30, the entry target characters entered by such user are created in a viewable manner. Random graphic table RMT has a table formed by a plurality of rows and a plurality of columns, in which a plurality of different entry target characters and figures that differ for each entry target character are arranged in a row or column. Each figure has a shape that cannot be converted by means of the character code used at the time of user operational input based on an input device used by the user for entering predetermined information.

For example, as shown in FIG. 3, random graphic table RMT of the present embodiment is a random graphic table in which the numbers "0" to "9" are arranged in a line in the first row as entry target characters and which consists of a plurality of rows (i.e. six rows) (i.e. random graphic table RMT in a matrix of 6 rows and 10 columns). Random graphic table RMT has different figures (i.e. 10 figures including symbols, graphics and pictures), each allocated to each of the numbers being the entry target characters, and the arrangement of the figures of each row has a different feature.

Random graphic table RMT of the present embodiment is provided to a user by being printed on a rear surface of a cash card (made of plastic) issued by a banking organization to the user, or is provided to the user by being printed on a dedicated passcode card (made of plastic or paper).

In addition, random graphic table RMT may also be provided by an electronic passcode card. In such case, the passcode card may be created by, for example, electronic paper and the random graphic table may be configured in a visible manner by electronic ink. The random graphic table may also be configured in a displayable manner by a personal computer or a smartphone. In this way, unlike cryptographic tokens, the cost for issuing random graphic tables RMT may be suppressed, and thus, the popularization thereof may be promoted.

While FIG. 3 illustrates the case where the entry target characters are configured by figures that cannot be deduced during data communication, such figures are sufficient as long as they cannot be uniquely deduced by means of general input devices, and, as described above, they may be, for example, still images, such as photographs, or figures that are formed by hand-written characters that are written in advance by a user.

In particular, in the case of using hand-written characters written by a user as the figures, the user is asked to write down numerical characters 0 to 9 and English characters A to Z in an application form at a predetermined timing, such as when opening an account or when applying for issuance of a passcode card, and then the figures of random graphic table RMT may be structured by making use of these written-down characters.

In the case where random graphic table RMT uses numerical characters as the entry target characters, at least numerical characters 0 to 9 need to be described in the first row. When making use of entries made through English characters, hiragana characters, katakana characters, kanji characters or other characters, letters A to Z or characters, which are to be entered, need to be described in the first row. However, regardless of which characters end up being used as the entry target characters, it is necessary to arrange each figure with respect to each character, in a corresponding manner, such that different figures are arranged in each row and such that the arrangement of such figures in the plurality of rows differs from row to row.

It should be noted that, in FIG. 3, the entry target characters are arranged in the first row of random graphic table RMT; however, in the present embodiment, they may be arranged in the last row of random graphic table RMT, or alternatively, they may be arranged in the first column or the last column thereof. In any case, as with the example of FIG. 3, it is necessary to arrange each figure with respect to each character, in a corresponding manner, such that different figures are arranged in each row or column and such that the arrangement of such figures in the plurality of rows or columns differs from row/column to row/column.

[3] Communication Terminal Device

Next, communication terminal device 10 of the present embodiment will be described with reference to FIG. 4. It should be noted that FIG. 4 is a block diagram illustrating a configuration of communication terminal device 10 of the present embodiment.

Figure 4:
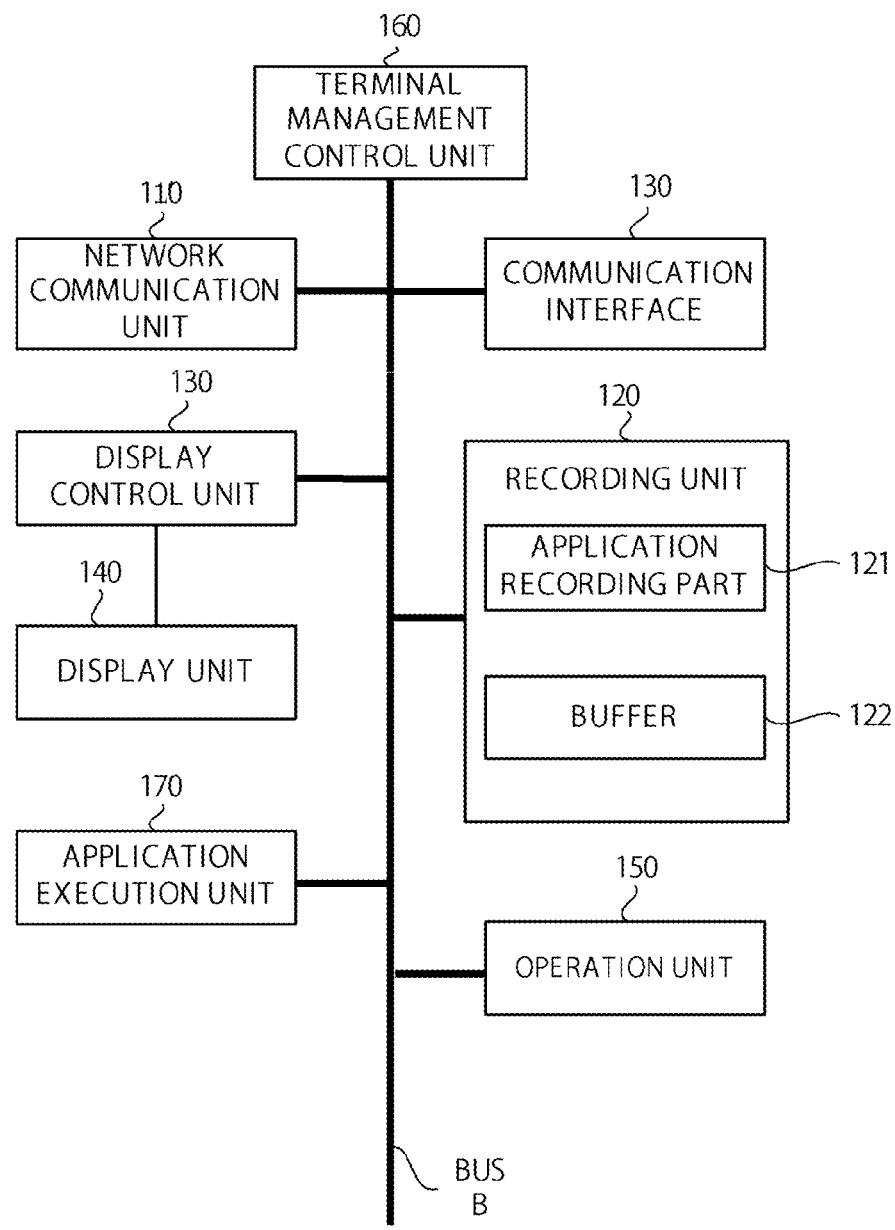
FIG. 4 is a diagram illustrating functional blocks of a communication terminal device in an embodiment.

As shown in FIG. 4, communication terminal device 10 of the present embodiment includes: network communication part 110; recording part 120; Display control unit 130; display 140; Operational unit 150; Terminal management control unit 160; and application execution unit 170.

The above parts are interconnected by means of bus B, through which data transfer is carried out among the respective components.

Network communication part 110 communicates with and is connected to network 20 either directly or via base station BS, and performs transmission/receipt of various kinds of data with banking organization servers 30 via network 20.

Recording part 120 is configured by, for example, a hard disk drive (hereinafter abbreviated as "HDD"), or a non-volatile flash memory of an NAND type, an NOR type, or the like.

Recording part 120 also includes application recording part 121 and buffer 122. A browser for achieving the browsing function is recorded in application recording part 121.

It should be noted that, when services are delivered by using an application dedicated for the Internet banking service, such dedicated application is recorded in application recording part 121. Buffer 122 is used as a work area for network communication part 110, Terminal management control unit 160 and application execution unit 170.

Display control unit 130 is adapted to generate display data necessary for display on display 140 and outputs the generated display data to such display 140.

Specifically, Display control unit 130 generates the display data for making image data corresponding to each figure to be displayed on display 140 in association with the entry target characters, based on the data for entry received from banking organization server 30, and supplies the data to display 140.

Display 140 is configured by, for example, a panel of liquid-crystal elements or organic electro luminescence (EL) elements and displays a predetermined image based on the display data generated in Display control unit 130.

Operational unit 150 is configured by various kinds of confirmation buttons, a mouse, a pointing device, and a number of keys and a touch panel such as a numeric keypad, and is adapted to be used by a user so that he/she may enter various kinds of information and select figures based on the data for entry. For example, Operational unit 150 is used when selecting one figure from among a plurality of figures displayed based on the data for entry. When touching is performed at a particular display position, Operational unit 150 provides the positional information of the figure that is displayed at the touched position to application execution unit 170.

Terminal management control unit 160 is configured mainly by a central processing unit (CPU) and includes various kinds of input/output ports such as a key input port, a display control port, or the like. Terminal management control unit 160 controls, in a comprehensive manner, overall function of communication terminal device 10 by executing the various applications recorded in recording part 120.

Application execution unit 170 is configured by the same CPU as, or an independent CPU from, Terminal management control unit 160, and executes, under control of Terminal management control unit 160, processes for receiving the Internet banking service by executing various applications recorded in application recording part 121.

[4] Banking Organization Server

Next, the configuration of banking organization server 30 of the present embodiment will be described with reference to FIGS. 5 to 9.

Figure 5:
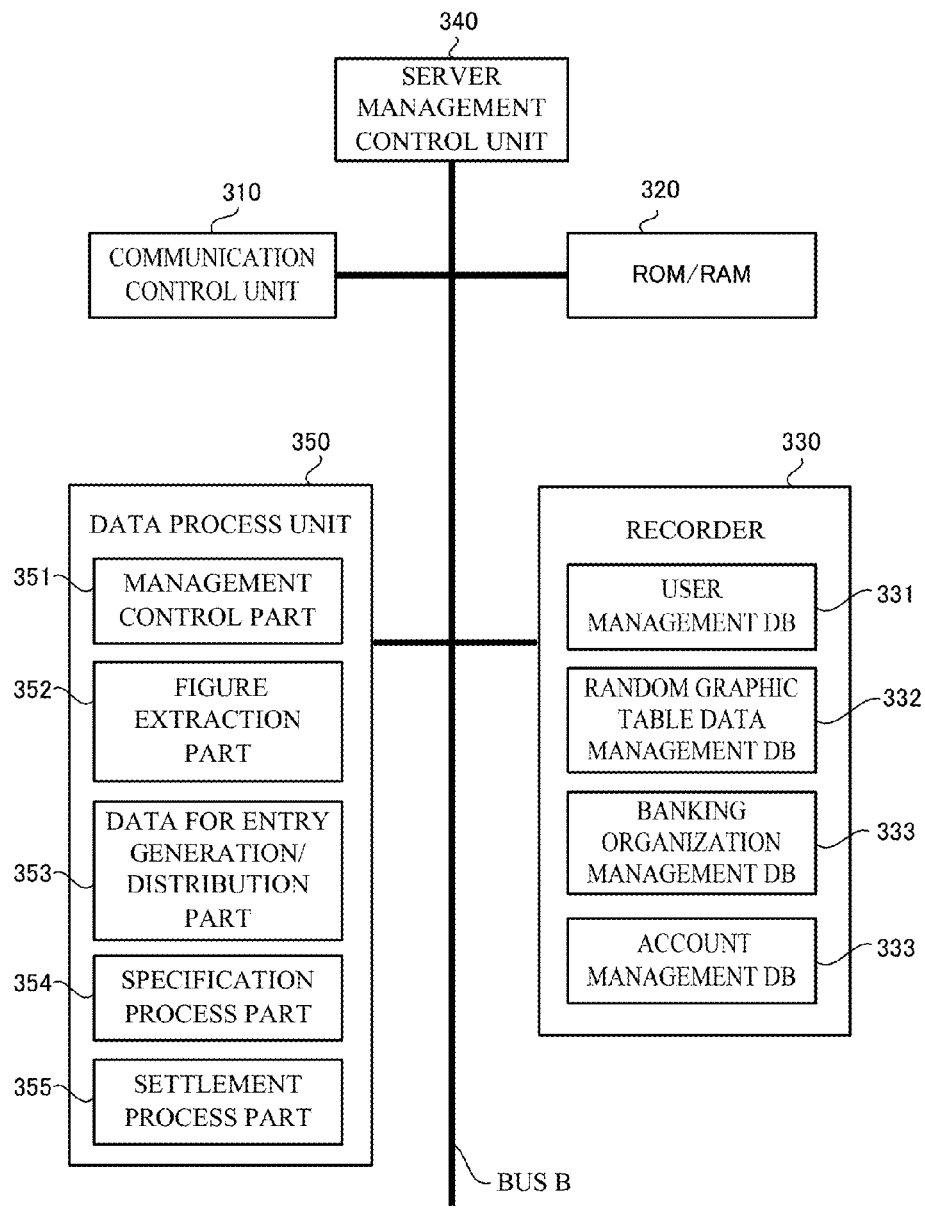
FIG. 5 is a diagram illustrating functional blocks of a banking organization server in an embodiment.

It should be noted that FIG. 5 is a diagram illustrating an example of functional blocks of banking organization server 30 of the present embodiment, while FIGS. 6 to 9 are respectively diagrams illustrating examples of data to be recorded in user management DB 331, random graphic table data management DB 332, banking organization management DB 333 and account management DB 334, provided in banking organization server 30 of the present embodiment.

As shown in FIG. 5, banking organization server 30 of the present embodiment includes: communication control part 310 that communicates with and is connected to network 20; ROM/RAM 320 that functions as various types of memories; recorder 330 wherein various of databases are structured; server management control unit 340 that controls the entire device; and data process unit 350 that executes various processes at the time of delivering the Internet banking service. The above parts are interconnected by means of bus B.

Communication control part 310 is a predetermined network interface, and constructs a communication channel with communication terminal device 10 via network 20 and performs transmission/receipt of various kinds of data.

ROM/RAM 320 has various programs recorded thereon which are necessary for driving banking organization server 30. In addition, ROM/RAM 320 is used as a work area when various processes are executed.

Recorder 330 is configured by, for example, a Hard Disc Drive (HDD) or a Solid State Drive (SSD). Recorder 330 includes, at least, user management DB 331, random graphic table data management DB 332, banking organization management DB 333 and account management DB 334. It should be noted that recorder 330 of the present embodiment configures, for example, the "database" of the present invention.

User management DB 331 is a database with which various kinds of information for managing a user who has already opened an account at an appropriate banking organization is registered as data. As shown in FIG. 6, for example, user attribute information is recorded in user management DB 331 in association with user IDs corresponding to the respective users.

More specifically, the user attribute information includes:
(1) the name of a corresponding user;
(2) the address of a corresponding user;
(3) the account name of a corresponding user; and
(4) a first passcode (login password) of a corresponding user.

The user attribute information is used for managing logins into the Internet banking service made by the users.

For example, FIG. 6 shows that, as the user attribute information corresponding to user ID "user 001," the user attribute information made up of name "Taro, . . . ," address " . . . Kita, Tokyo," account name "2351000," and first passcode "****" is recorded.

It should be noted that the account name may be the account number, the client number, or the like, and it may also be the same as the user ID.

Random graphic table data management DB 332 is a database for managing random graphic table data corresponding to random graphic tables RMTs issued in advance to the respective users. As shown in FIG. 7, for example, user IDs corresponding to the respective users and random graphic table data that indicates the content of random graphic tables RMTs issued to the users are associated with each other and recorded in random graphic table data management DB 332.

For example, FIG. 7 shows that random graphic table data "DATA 001" to "DATA 004" are respectively associated with "user 001" to "user 004" and recorded.

In particular, the random graphic table data recorded in random graphic table data management DB 332 has a data configuration in which: the entry target characters included in random graphic table RMT; and the image data for icon-wise display of the figures allocated to the corresponding entry target characters on communication terminal device 10, are arranged in the same matrix format as that of random graphic table RMT, as illustrated in FIG. 3.

It should be noted that the image data corresponding to the respective figures may be configured in any of the following formats, for example:

(1) bitmaps corresponding to pictures or graphics that are indicative of various symbols, including scholarly symbols (for example, mathematical symbols, such as calculus symbols, map symbols, music symbols or the like);

(2) still images such as photographs;

(3) moving images; or (4) images of hand-written characters.

In particular, when still images are used as image data for the figures, the image data may be configured in a data format such as Joint Photographic Expert Group (JPEG) or the like.

In addition, when the image data for the figures is configured by moving images, the image data may be configured in a format such as GIF or the like. Thus, the image data may be configured in data formats such that the following display methods are achieved. Namely, the figures may be displayed on communication terminal device 10 such that they gradually become visible. Alternatively, the figures may be displayed such that the order thereof may be changed, or the figures may be displayed after a predetermined time period has elapsed.

Moreover, displaying the figures as moving images makes it difficult to specify the figures contained in the data for entry distributed to communication terminal device 10 and it also makes it difficult for a malicious third party to conduct various attacks. However, this also requires that the moving images of the figures be provided in the issued random graphic tables RMTs by way of a playable electronic paper, a portable terminal device, or the like.

In addition, in the case where beneficiary information (the banking organization, the beneficiary account number at a branch office, the account holder) concerning the beneficiary, which is registered in advance by the user is allocated to the entry target characters, or in the case where a predetermined fixed sentence or fixed format is allocated to the entry target characters, such beneficiary information, the predetermined fixed sentence, or the like, may also be registered in association with the entry target characters.

Banking organization management DB 333 is a database in which information for managing the respective banking organizations is recorded as data. For example, as shown in FIG. 8, the following items are recorded in banking organization management DB 333, in association with banking organization codes (SWIFT code) for identifying the respective banking organizations:

(1) the name of the relevant banking organization;

(2) the names of the branch offices run by the relevant banking organization;

(3) the codes of the relevant branch offices; and (4) the addresses of the relevant branch offices.

For example, FIG. 8 shows that "Oedo Bank," with banking organization code "001," runs the "Shinjuku branch office," the "Shibuya branch office" and the "Nihonbashi main office," and the codes, and the like, of the respective branch offices are recorded.

It should be noted that the banking organization codes are allocated to the banking organizations one by one, whereas the branch office codes are allocated in a unique manner for each banking organization. In addition, instead of the banking organization codes, bank codes such as SWIFT codes, or other codes including country names, location codes, branch office codes or the like, may be used.

Account management DB 334 is a database in which data corresponding to information for managing accounts opened by the respective users is recorded. As shown in FIG. 9, for example, (1) user IDs of the respective users and (2) the account information are associated with each other and recorded in account management DB 334.

More specifically, the account information includes:

(2A) the account number of the relevant account;

(2B) the bank name and branch office name at which the relevant account is opened;

(2C) the balance of the relevant account; and (2D) the information indicating the registered payment destinations, and the above information is used for managing the user accounts.

For example, FIG. 9 shows an example where the account information made up of account number "123456," banking organization name "Oedo Bank," branch office name "Shinjuku branch office," balance "¥***," registered payment destinations "Oedo Bank, Nihonbashi main office, *" and "Δ Bank, Shibuya branch office, **" is recorded as the account information for "user 001."

It should be noted that, in the present embodiment, the registered payment destinations information may be used as the above-described beneficiary information.

Server management control unit 340 is configured mainly by a central processer unit (CPU) and controls the respective parts of banking organization server 30, in an integrated manner, by executing programs.

Data process unit 350 is configured by the same CPU as, or an independent CPU from, server management control unit 340, and executes the following processes by executing applications, under control of server management control unit 340, at the time of delivering the Internet banking service during the remittance process from communication terminal device 10 to a predetermined account or other settlement process: a data for entry distribution process in which the data for entry is distributed to communication terminal device 10; an entry target characters specification process in which the entry target characters are specified based on the marker information sent from communication terminal device 10 in accordance with entries based on the data for entry and random graphic table RMT; and a servicing process in which the predetermined Internet banking service is executed based on the specified entry target characters.

Specifically, data process unit 350 coordinates with communication control part 310 and recorder 330 and embodies: management control part 351 that performs recording and updating of data to the respective databases, and management of other Internet banking services; figure extraction part 352 that, at the time of delivering the Internet banking service, specifies the random graphic table data of the relevant user and extracts part of the figures from the specified random graphic table data; data for entry generation and distribution part 353 that executes the data for entry distribution process based on the extracted figures; specification process part 354 that executes a process of specifying the entry target characters; and settlement process part 355 that executes the Internet banking service based on the specified entry target characters, such as a settlement process (hereinafter referred to as the "specific banking service").

It should be noted that, for example, management control part 351 of the present embodiment configures the "controller" of the present invention, and figure extraction part 352 configures the "specifying unit" and "extracting processer" of the present invention. For example, data for entry generation and distribution part 353 of the present embodiment configures the "distributer" of the present invention and specification process part 354 configures the "acquiring processer" of the present invention. Furthermore, for example, settlement process part 355 of the present embodiment configures the "specific processer" of the present invention.

Management control part 351 manages reading and writing of data with respect to each database. In addition, management control part 351 generates random graphic table data based on random graphic tables RMTs that are taken in in advance, manually, or by means of a scanner, not shown, or the like, and the generated random graphic table data is recorded in random graphic table data management DB 332 in association with the corresponding user IDs.

The way in which the random graphic table data is generated at management control part 351 is arbitrary. For example, random graphic table data corresponding to random graphic table RMT as illustrated in FIG. 3 may be generated by separating the figures contained in random graphic table RMT and arranging them in a matrix form, in association with the entry target characters.

In addition, in response to a request to execute the Internet banking service from communication terminal device 10, management control part 351 distributes data corresponding to a login page of the Internet banking service to the relevant communication terminal device 10 and executes user authentication based on the account name and the first passcode (password), which the user entered based on such data, and the user attribute information.

Then, after logging in, management control part 351 coordinates with communication terminal device 10 and executes, based on the user operations, processes related to various Internet banking services, such as a balance inquiry for an account, an application for a loan, or the like, except for the specific banking service, such as a settlement process.

When a processing request in the specific banking service, such as a settlement process, is received, figure extraction part 352 searches, under control of management control part 351, random graphic table data management DB 332 based on the user ID used at the time of logging in and reads the relevant random graphic table data from random graphic table data management DB 332. Then, figure extraction part 352 extracts image data corresponding to a plurality of figures that belong to, for example, two randomly selected rows from the read random graphic table data.

For example, when random graphic table data corresponding to random graphic table RMT shown in FIG. 3 is read, figure extraction part 352 extracts image data that corresponds to each of the figures arranged in row B and row E, as the figures for specifying the entry target characters from the read random graphic table data.

Data for entry generation and distribution part 353 executes, under control of management control part 351, generation and distribution of the data for entry, in coordination with communication control part 310, when the process request in the specific banking service, such as a settlement process, is received and when the image data of a plurality of figures is read by figure extraction part 352.

Specifically, data for entry generation and distribution part 353 generates the data for entry based on the image data of the respective figures extracted by figure extraction part 352, and distributes the generated data for entry to the relevant communication terminal device 10.

More specifically, data for entry generation and distribution part 353 specifies display positions of the image data of the extracted figures and determines positional information (i.e. the marker information) that indicates the display positions of the specified figures. Then, data for entry generation and distribution part 353 generates the data for entry that includes: the image data of the respective figures; the positional information that indicates the display positions of the respective figures; display control data for causing the image data of the respective figures to be displayed at the respective display positions; and indication data for indicating the entry to the user, and distributes the generated data for entry to the relevant communication terminal device 10.

For example, a case is assumed in which image data of the respective figures arranged in row B and row E in the random graphic table data corresponding to random graphic table RMT shown in FIG. 3 is read. In such case, data for entry generation and distribution part 353 determines the display positions (for example, pixel coordinates for displaying the image data of the figures on the screen of communication terminal device 10, and specifically, the center coordinates (x, y) that indicate the center of the image data) for displaying the respective figures in a line and in a random manner on communication terminal device 10, based, for example, on the column display for displaying row B, such that the figure at row B and column 2 is displayed at the far right and the figure at row B and column 5 is displayed at the display position in the next row. Then, data for entry generation and distribution part 353 generates the data for entry that includes the positional information that indicates the determined display positions of the figures.

It should be noted that data for entry generation and distribution part 353 determines the display positions for displaying the respective figures in a line and in a random manner on communication terminal device 10, based on the column display for displaying row E.

In addition, as for the indication data for indicating the figures to be selected by the user, the indication data includes, for example, character string (text) data, such as "please select the figures corresponding to the characters you would like to enter from row B of random graphic table."

When specification process part 354 receives the positional information (i.e. the marker information corresponding to the figures entered based on the data for entry and random graphic table RMT), which is acquired when the figures are entered by the user, based on the data for entry, at communication terminal device 10, specification process part 354 specifies the entry target characters corresponding to the figures selected by the user based on: the received positional information; the relevant random graphic table data; and information used for the generation of the data for entry by figure extraction part 352, such information being information indicating the rows of random graphic table RMT when the figures are extracted (hereinafter referred to as the "extracted information").

For example, for the random graphic table data corresponding to random graphic table RMT shown in FIG. 3, when the image data of the respective figures arranged in row B in the random graphic table data corresponding to random graphic table RMT shown in FIG. 3 is read and when the figure at row B and column 2 is arranged at the far right and the positional information (the marker information) that indicates the position thereof is received, specification process part 354 specifies entry target character "2" corresponding to position "row B and column 2" as the entry target character.

It should be noted that specification process part 354 specifies a plurality of entry target characters, for example, in accordance with the order in which the entry target characters are entered. More specifically, when specification process part 354 is to specify double-digit entry target characters, it specifies the same by associating the first-specified entry target character with the upper digit and then by associating the next-specified entry target character with the lower digit.

Settlement process part 355 determines predetermined information, such as the account of the beneficiary or the money-receipt amount, in accordance with the specified entry target characters and executes the settlement process based on the determined information.

For example, settlement process part 355 executes a settlement process in which settlement process part 355 specifies the banking organization of the beneficiary in accordance with the specified entry target characters, reduces the balance by the money-receipt amount from the account information of the relevant user, and transmits the specified money-receipt amount to the account of the beneficiary.

It should be noted that the settlement process in the present embodiment is similar to that in conventional Internet banking services, and therefore, the details thereof will be omitted.

[5] Network System Operations (Settlement Process)

Next, the operations of the settlement process executed in network system 1 of the present embodiment will be described with reference to FIGS. 10 to 13.

Figure 10:
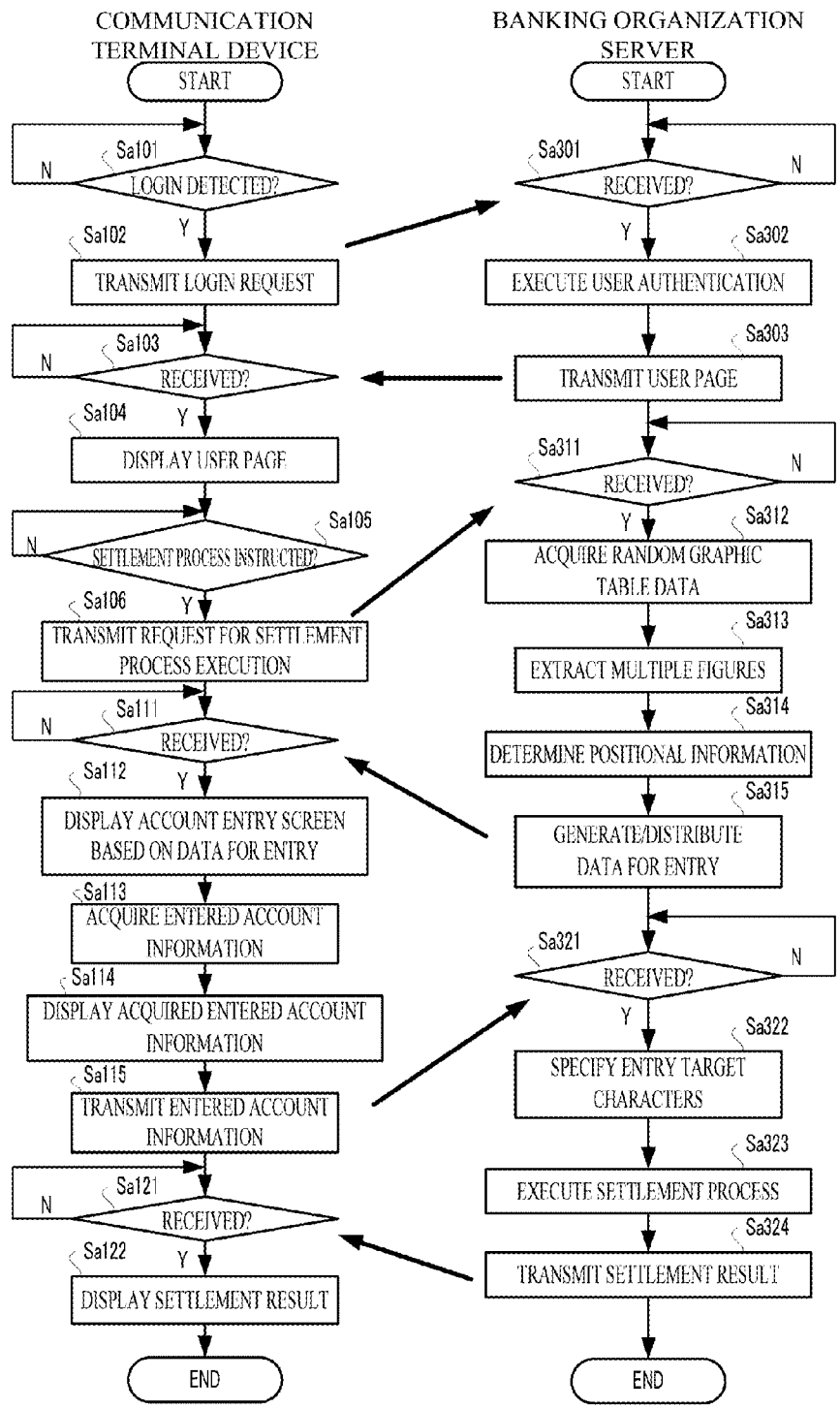
FIG. 10 is a flowchart illustrating operations of a settlement process to be executed in a network system of an embodiment.
Figure 12A:
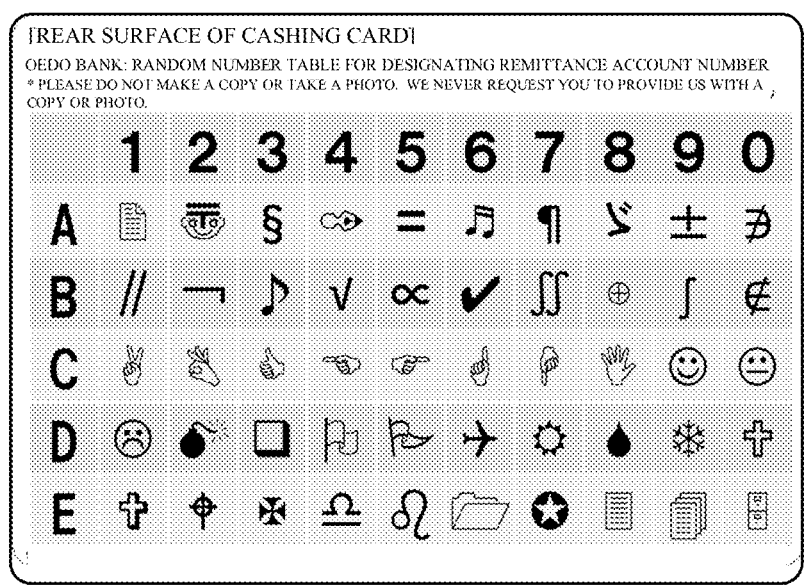

FIG. 10 is a flowchart illustrating the flow of the process executed at network system 1 of the present embodiment, FIG. 11 is a diagram illustrating an example of a login page when logging into the Internet banking service in network system 1 of the present embodiment. FIGS. 12A and 12B are diagrams each illustrating examples of an entry screen when a user enters various kinds of information based on the data for entry in network system 1 of the present embodiment and FIG. 13 is a diagram illustrating an example of a confirmation screen that is displayed after the user has entered the various kinds of information based on the data for entry in network system 1 of the present embodiment.

In the present operations, it is assumed that the information of FIGS. 6 to 9 is already stored in the respective DBs 331 to 334 of banking organization server 30 and that communication terminal device 10 is displaying the predetermined login screen illustrated in, for example, FIG. 11 and is standing by for the user to enter an instruction into Operational unit 150 to the effect that the Internet banking service is to be performed.

It should be noted that, in the present operations, the description is given on the premise that a settlement process (particular banking service) is executed in which a remittance process to the account of a third party is performed.

First, at communication terminal device 10, application execution unit 170 detects an account name and a first passcode via Operational unit 150, and then an input operation of selecting the "login" button (Step Sa101). Then, application execution unit 170 transmits a login request, including the entered account name and first passcode, to banking organization server 30 in accordance with the applications recorded in application recording part 121, and makes a transition to a receipt standby mode (Step Sa102).

Next, at banking organization server 30, communication control part 310 receives the login request transmitted from communication terminal device 10 (Step Sa301). Management control part 351 searches user management DB 331 based on the account name and the first passcode contained in the login request, specifies a user ID and executes user authentication (Step Sa302).

Subsequently, when the login is made by successfully executing the user authentication, management control part 351 transmits to the relevant communication terminal device 10, via communication control part 310, data corresponding to a web page for the relevant user to execute various net-banking services (hereinafter referred to as the "user page"), and makes a transition to a receipt standby mode (Step Sa303).

It should be noted that, at Step Sa302, when the login is unsuccessful, management control part 351 transmits accordingly to the relevant communication terminal device 10 and terminates the present operations. When communication terminal device 10 is notified of the fact that the login was unsuccessful, it returns to the process in Step Sa101. In addition, when management control part 351 receives a logout instruction from communication terminal device 10, during the logged-in state, it terminates the present operations, regardless of the processes in the present operations.

Subsequently, at communication terminal device 10, network communication part 110 receives the data for the user page (Step Sa103). Then, application execution unit 170, in coordination with Display control unit 130, causes display 140 to display the image of the user page and stands by for an operational input of a settlement process for executing a remittance to the account of a third party (Step Sa104).

It should be noted that, when application execution unit 170 detects a logout instruction via Operational unit 150, during the logged-in stage, application execution unit 170 terminates the present operations by transmitting a logout instruction to banking organization server 30, regardless of the processes in the present operations.

Subsequently, application execution unit 170 detects an instruction for executing a settlement process via Operational unit 150 (Step Sa105). Then, application execution unit 170 transmits a request for executing such settlement process to banking organization server 30 and makes a transition to a receipt standby mode (Step Sa106).

Subsequently, at banking organization server 30, management control part 351 receives the request for executing the settlement process (Step Sa311). Then, management control part 351 causes figure extraction part 352 to read, from random graphic table data management DB 332, the random graphic table data corresponding to the relevant user (i.e. the user who is in the logged-in state and who requested the settlement process) and acquires the same (Step Sa312).

Subsequently, figure extraction part 352 extracts a plurality of figures that belong to an arbitrary line, in a random manner, from the read random graphic table data in order to select a plurality of entry target characters (Step Sa313).

Subsequently, data for entry generation and distribution part 353 reads the image data corresponding to the figures extracted from random graphic table data management DB 332, specifies the display positions of the image data for each of the extracted figures, and determines the positional information (i.e. the marker information) that indicates the display positions of the specified figures (Step Sa314).

Subsequently, data for entry generation and distribution part 353 generates the data for entry and distributes the generated data for entry to the relevant communication terminal device 10 (Step Sa315). The data for entry includes: the image data of each of the read figures; the positional information (the marker information) that indicates the display positions of the respective figures; the display control data for causing the image data of each of the figures to be displayed at the corresponding display position; and the indication data for indicating the entry to the user.

For example, data for entry generation and distribution part 353 generates, as illustrated in FIG. 12B, the data for entry that includes:

data for displaying, at communication terminal device 10,
(1) the name of the money-receiving banking organization,
(2) the money-receipt amount, (3) the name of the money-receiving branch office, (4) a pull-down box for selecting an account type (savings, checking, or the like), and (5) a text box for entering a predetermined number of digits from the top (for example, the first five digits) of the money-receiving account number;

(6) image data corresponding to a character string, such as "please select the figure relevant to (the second digit from the bottom) from row B," and figures in row B in order to select entry target characters (for example, the last two digits of the account number) to be entered by means of figures; and (7) image data corresponding to a character string, such as "please select the figure corresponding to the last digit from row E," and figures in row E.

It should be noted that each text box may be replaced by a pull-down box.

Subsequently, at communication terminal device 10, network communication part 110 receives the data for entry distributed from banking organization server 30 (Step Sa111). Then, application execution unit 170 causes an entry screen (hereinafter also referred to as the "screen for entering account information"), such as that illustrated in FIG. 12B, to be displayed based on the received data for entry (Step Sa112).

Subsequently, application execution unit 170, in coordination with Operational unit 150 and in accordance with the screen for entering account information, acquires the entered remittance amount, the name of the beneficiary bank, the name of the branch office, the account type, and part of the account number. Application execution unit 170 also acquires the entered account information, including the positional information of the figures for specifying the other part (i.e. the entry target characters) of the account number, which was entered by referring to the relevant random graphic table RMT (Step Sa113).

In particular, when application execution unit 170 of the present embodiment detects the positions of the figures corresponding to the numbers of the last two digits of the account number, it specifies the positional information that indicates the detected positions of the figures, as the information for specifying the entry target characters by means of the figures.

For example, when the last two digits of the account number, which are to become the entry target characters, are "27" and when the figure at row B and column 2 and the figure at row E and column 1 in random graphic table RMT are selected by Operational unit 150 (i.e. when the display positions of the relevant figures are touched), application execution unit 170 specifies, as the positional information of the figure of the upper digit, the positional information of the image data that indicates the seventh position from the left facing the plane of FIG. 12B and, as the positional information of the figure of the lower digit, the positional information of the image data that indicates fifth position from the left facing the plane of FIG. 12B.

Subsequently, application execution unit 170 displays, on the display 140, the entered account information including the positional information as the marker information (Step Sa114). Then, application execution unit 170 transmits such entered account information to banking organization server 30 and stands by for the receipt of information indicating the remittance result (Step Sa115).

It should be noted that application execution unit 170 displays on display 140, in coordination with Display control unit 130 and for example as shown in FIG. 13, the information (the banking service specific information) acquired in Step Sa113, which includes the positional information as the marker information. However, application execution unit 170 may display, in coordination with banking organization server 30, the banking service specific information on display 140 after the acquisition thereof when the account is confirmed at the relevant banking organization server 30.

Subsequently, at banking organization server 30, communication control part 310 receives the entered account information transmitted by communication terminal device 10 (Step Sa321). Then, specification process part 354 specifies the entry target characters corresponding to the figures selected by the user, based on the positional information included in the received entered account information, the data for entry distributed to the relevant user, and the random graphic table data of such user (Step Sa322).

More particularly, in the present embodiment, specification process part 354 determines the beneficiary account number, which is made up of seven digits, by combining the characters for the last two digits, which are specified by the positional information, with the first five digits of the account number, which are entered by the user in the entry screen.

Subsequently, settlement process part 355 executes a settlement process in which the remittance process is performed based on the entry target characters specified in Step Sa322 and the information included in the received entered account information (Step Sa323). Specifically, settlement process part 355 performs the remittance process based on the specified beneficiary account number, the names of the beneficiary banking organization and the branch office, etc. included in the entered account information.

It should be noted that, at this time, when the account information, etc. is appropriately specified, the beneficiary banking organization server 30 adds the amount of money corresponding to the remittance amount to the balance in the account information corresponding to the beneficiary account in the account management DB, and notifies the paying banking organization server 30 of the fact that the remittance was appropriately executed.

Lastly, settlement process part 355 transmits settlement result information indicating the result of the settlement to the relevant communication terminal device 10 (Step Sa324) and terminates the present operations.

It should be noted that management control part 351 transmits the settlement result information after receiving the notification from the beneficiary banking organization server 30. After transmitting the settlement result information, management control part 351 may retain the logged-in status after completion of the settlement process without terminating the present operations and may stand by for a further input operation from the relevant communication terminal device 10.

On the other hand, at the communication terminal device 10, application execution unit 170 receives the settlement result information via network communication part 110 (Step Sa121). Then, in coordination with Display control unit 130, application execution unit 170 displays the received settlement result information on display 140 (Step Sa122) and terminates the present operations.

It should be noted that, similarly to banking organization server 30, application execution unit 170 may retain the logged-in state after displaying the settlement result information without terminating the present operations and may make a transition to the process in Step Sa104.

As described above, network system 1 of the present embodiment is capable of preventing: the leakage of security-related information (for example, a password) caused by a user's carelessness, for example, by entering, all at once, at a phishing site, all of the information described in random graphic table RMT, or the like, which is issued to a user in advance; and the transfer of information to a third party who performs an illegal login.

In addition, network system 1 of the present embodiment is capable of effectively preventing illegal logins and man-in-the middle attacks made by a third party to the services delivered to the users.

Accordingly, network system 1 of the present embodiment is capable of preventing the leakage of security-related information, illegal use and man-in-the middle attacks and of improving the security at the time of delivering various services such as the Internet banking service.

[6] Variations

[6.1] Variation Example 1

The above-described embodiment is configured such that part of the paying-in account number is entered based on the data for entry; however, it is also possible that part of the banking organization name, the paying-in amount, etc. is entered based on the data for entry.

Even when this method is adopted, it is possible to improve the security in the Internet banking service by preventing various attacks by a third party and to prevent illegal use, or the like.

[6.2] Variation Example 2

The above-described embodiment adopts a configuration in which the security is improved by performing entry through the data for entry and random graphic table RMT, after performing the first level user authentication using a password (first passcode).

However, as is the case in, for example, online stores using a network, in the case of a service where a settlement is executed only with the user's account name and password, part of the account name, part of the password, or both, may be entered using the random graphic table data and random graphic table RMT.

In such case, communication terminal device 10 may transmit, for example, only the account name, and banking organization server 30 may specify the user ID and the random graphic table data in accordance with the transmitted account name, may generate data for entry for entering the password, and may distribute the generated data for entry to communication terminal device 10.

[6.3] Variation Example 3

The above-described embodiment adopts a configuration in which part of the information to be entered by the user is entered based on the random graphic table data and random graphic table RMT; however, all of the information to be entered by the user may be entered based on the random graphic table data and random graphic table RMT.

[6.4] Variation Example 4

The above-described embodiment adopts a configuration in which the data for entry, including all figures corresponding to the last two digits of the account number, is distributed from the banking organization server 30 to communication terminal device 10 and the user is requested to select figures for the two characters all at once; however, the user may be requested to enter one figure at a time.

In this case, banking organization server 30 may distribute the data for entry for one character to communication terminal device 10, and communication terminal device 10 may just have to sequentially specify the characters by executing the procedure of transmitting the marker information, selected based on such data for entry, to banking organization server 30 in a repeated manner.

[6.5] Variation Example 5

In the above-described embodiment, there may be cases in which a credit card is registered in the services, such as the online stores, etc. The leakage of the credit card number and security code thereof is prevented in an effective manner by making use of the data for entry and random graphic table RMT, as with the present embodiment, at the time of registering the credit card, and thus, the safe use of credit cards is also achieved.

[6.6] Variation Example 6

The above-described embodiment adopts a configuration in which the respective DBs 331 to 334 are provided and managed in banking organization server 30; however, it is possible to adopt a configuration in which each of DBs 331 to 334 is managed by a separate computer.

[6.7] Variation Example 7

In the above-described embodiment, banking organization server 30 may be configured as a server system that is configured by a plurality of computers.

[6.8] Variation Example 8

In the above-described embodiment, a description is given as to an example in which banking organization server 30 is provided at each banking organization and a cash flow is made among banking organization servers 30 of different banking organizations; however, in the case when a cash flow is to be made within one and the same banking organization, one banking organization server 30 is sufficient for managing such cash flow.

[6.9] Variation Example 9

In the above-described embodiment, banking organization server 30 executes the settlement process, including remittance, using random graphic table RMT with the above-described numerical characters "0" to "9"; however, the present variation example may be configured such that, for example, beneficiary information (the banking organization, account number at the paying-in branch office, the account holder) related to the beneficiary, which is registered in advance by the user, is allocated to the numerical characters or other entry target characters, and then, such transmission destination information may be acquired.

In this case, when the user selects the entry target characters by way of the figures, banking organization server 30 uniquely specifies the beneficiary information corresponding to the entry target characters selected by the user and executes the settlement process based on the specified beneficiary information.

It should be noted that random graphic table RMT of the present embodiment may be able to specify numerical characters, or further, fixed sentences, or the like, from the figures selected by the user, by requiring the user to create predetermined fixed sentences or fixed formats in advance and by associating such fixed sentences, etc. with each of the numerical characters.

1 network system
10 communication terminal device
110 network communication unit
120 recording unit
121 application recording part
122 buffer
130 display control unit
140 display
150 operation unit
160 terminal management control unit
170 application execution unit
30 banking organization server
310 communication control unit
320 ROM/RAM
330 recorder
331 user management DB
332 random graphic table management DB
333 banking organization management DB
334 account management DB
340 server management control unit
350 data process unit
351 management control part
352 figure extraction part
353 data for entry generation and distribution part
354 specification process part
355 settlement process part

The invention claimed is:

1. A server system, comprising:
a receiver that receives, via a network, data from a communication terminal device that communicates with and is connected to the server system;
a controller that controls a database in which table data is recorded in association with identification information for identifying a user, the table data being predetermined for each user of the communication terminal device and having entry target characters entered at the communication terminal device and figures pre-allocated to the respective entry target characters that are associated with each other;
a data specifying processor that specifies, when a given request designated by a user from the communication terminal device is received by the receiver, table data that corresponds to the user;
an extracting processor that extracts the figures that correspond to entry target characters to be specified by the user based on the specified table data;
a distributer that generates data for entry that is associated with each of the extracted figures and that includes marker information to be used when relevant figures are displayed at a relevant communication terminal device, and that distributes the generated data for entry to the communication terminal device;
an acquiring processor that acquires, when the figures are displayed at the communication terminal device based on the distributed data for entry, the marker information that corresponds to the figures entered by the user from the communication terminal device;
a determining processor that determines the relevant figures based on the acquired marker information; and
a specific processor that specifies the entry target characters to be specified based on the determined figures and that executes a given process based on the specified entry target characters.

2. The server system according to claim 1, wherein the specific processor specifies character string used to execute the given process based on the specified entry target character to be specified, and executes the given process based on the specified character string.

3. The server system according claim 2, wherein the extracting processer extracts the figures more than the number of the entry target characters.

4. The server system according to claim 2, wherein the acquiring processor that acquires character string having at least one character inputted by the user from the communication terminal device, and the specific processor specifies the character string composed by the specified entry target character and character string directly inputted by the user and used to execute the given process.

5. The server system according to claim 1, wherein each of the figures has a shape unconverted by a character code that is used when the user inputs by a input device that is used to input a given information by the user.

6. The server system according to claim 5, wherein the figure is expressed by at least one of a symbol, a design, a picture and an image.

7. The server system according to claim 1, wherein the marker information is positional information that indicates a position where the figure is displayed in the communication terminal device.

8. The server system according to claim 1, wherein a table is provided for each of the users, the table being visible and having a plurality of figures, each of the plurality of figures being arranged at a predetermined position in a matrix, a type of each of the plurality of figures be different from each other, and the extracting processer extracts the plurality of figures arranged at a specific row or column of the matrix in the table.

9. The server system according to claim 1, wherein the extracting processor, change the extracted specific row or column of the matrix in the table when generating the data for entry every time the given processing is extracted or figures is specified, and extracts the figures that correspond to entry target characters to be specified by the user.

10. The server system according to claim 1, wherein the entry target character includes numerical characters 0 to 9.

11. The server system according to claim 1, wherein the entry target character includes English characters A to Z.

12. The server system according to claim 1, wherein the specific processor executes a process of a bank clearance, as the given process, based on account information specified by the specified entry target character, the account information including at least one of a user's account number, remittance amount, a banking organization account number and an account number of a branch office.

13. A communication system, comprising:
a server system according to claim 1; and
a plurality of communication terminal devices that communicates with and is connected to the server system via a network.

14. A communication terminal device that is connected to a server system that executes various processes, via a network and that deliver various services to a user while they transmit/receive data to/from the server system, the communication terminal device comprising:
- an acquiring processer that acquires part of table data, along with control information for controlling, at least, display positions for displaying figures on a display, from the server system, the table data being table data predetermined for each user, the table data including entry target characters that are entered by the user and figures that are pre-allocated to the respective entry target characters, the entry target characters and the figures in the table data being associated with each other;
- an receiver that receives an input operation of the user in accordance with an image displayed based on the acquired table data;
- a specifying processer that specifies the display positions corresponding to the figures designated by the user in response to the input operation; and
- a transmitter that transmits information that indicates the display positions corresponding to the specified figures to the server system.

15. A communication method, comprising:
- receiving, via a network, data from a communication terminal device that communicates with and is connected to the server system;
- controlling a database in which table data is recorded in association with identification information for identifying a user, the table data being predetermined for each user of the communication terminal device and having entry target characters entered at the communication terminal device and figures pre-allocated to the respective entry target characters that are associated with each other;
- specifying, when a given request designated by a user from the communication terminal device is received, table data that corresponds to the user;
- extracting the figures that correspond to entry target characters to be specified by the user based on the specified table data;
- generating data for entry that is associated with each of the extracted figures and that includes marker information to be used when relevant figures are displayed at a relevant communication terminal device, and that distributes the generated data for entry to the communication terminal device;
- acquiring, when the figures are displayed at the communication terminal device based on the distributed data for entry, the marker information that corresponds to the figures entered by the user from the communication terminal device;
- determining the relevant figures based on the acquired marker information; and
- specifying the entry target characters to be specified based on the determined figures and that executes a given process based on the specified entry target characters.

* * * * *